(12) United States Patent
Johnson et al.

(10) Patent No.: US 6,354,075 B1
(45) Date of Patent: Mar. 12, 2002

(54) VENTED ROCKET MOTOR SPACER

(75) Inventors: Randolph T. Johnson, Waldorf; Gerald L. Armstrong, Hughsville; Joseph J. Dulcey, Waldorf, all of MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/670,339

(22) Filed: Sep. 27, 2000

(51) Int. Cl.[7] .................................................. F02K 9/36
(52) U.S. Cl. ........................................ 60/204; 60/255
(58) Field of Search ........................... 60/204, 253, 255

(56) References Cited

U.S. PATENT DOCUMENTS

| | | | | |
|---|---|---|---|---|
| 2,937,493 A | * | 5/1960 | Adelman | 60/35.6 |
| 2,957,309 A | * | 10/1960 | Kobberman | 60/35.6 |
| 3,077,734 A | * | 2/1963 | Adelman | 60/35.6 |
| 3,713,395 A | * | 1/1973 | Carpenter | 102/103 |
| 3,919,841 A | * | 11/1975 | Panella | 60/255 |

* cited by examiner

Primary Examiner—Charles G. Freay
Assistant Examiner—Ehud Gartenberg
(74) Attorney, Agent, or Firm—Mark Homer

(57) ABSTRACT

The present invention comprises a direct replacement for a charge support spacer currently used in rocket motors. The present invention comprises a vented spacer that cools combustion gases through contact and expansion prior to equalizing pressure by transferring these gases from the inside of the propellant grain to the outside of the grain. The vented spacer takes gases from combustion of the propellant from the core flow inside the propellant grain and cools these gases by contact with and ablation of the spacer material. The gases are cooled to the point that they present no hazard to the rocket motor casing or the outside of the propellant grain. The vented spacer accomplishes these tasks in the same amount of area as the current charged support spacer.

6 Claims, 3 Drawing Sheets

100

100

VENTED ROCKET MOTOR SPACER

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention pertains to an improvement in venting combustion gases in rocket motors. More particularly the present invention relates to an improved vented spacer to help equalize pressure between the inside and outside of the propellant grains inside rocket motors.

2. Description of the Related Art

Solid-propellant rocket motors are sometimes loaded with free-floating cartridge-loaded propellant grains to facilitate loading and reduce costs. These grains are not structurally adequate to support the pressure which results during combustion, so the pressure must be equalized between the inside and outside of the grain to prevent potentially catastrophic failures. One method of equalizing this pressure is to vent a small portion of the gases from inside the propellant grain to the annular space between the outside of the propellant grain and the rocket motor tube.

Since the combustion process is luminous and the gases created are extremely hot, over 4000° F., venting combustion gases creates a danger of overheating the motor tube of a rocket motor by radiative and convective heating. There is also a danger of igniting the outside diameter of the propellant grain, a surface which was not intended to burn. Case heating and increased gas generation both cause failure of the case of the rocket motor, throwing extremely hot pieces of propellant and casing in all directions. Case heating is especially a problem when, in the interest of minimizing weight, aluminum is used for the motor case material.

Newer, less sensitive, more energetic propellants have higher flame temperatures than previous propellants. The higher operating temperatures increase the danger of overheating the rocket motor casing during the venting process. Therefore, the amount of heat permitted to reach the casing wall must be minimized. Unfortunately, the need to maximize the energy density of the rocket motor puts space at a premium. Thus, space for a venting arrangement is limited. This increases the difficulty in designing solutions to the problems set forth above.

In current cartridge-loaded rocket motors, a charge support spacer is used to vent combustion gases. In such a current device, a propellant grain is contained within a motor case. The propellant grain is sealed at the nozzle end of the motor. The charge support spacer is located between the end of the propellant grain and a spring which holds the propellant in place. A group of heat cups are placed around the springs to assist in protecting the portion of the casing surrounding the springs from heating from propellant gases. Although the heat cups provide some relief from heat generated during combustion, this relief is marginal, especially when a hotter propellant is used. The charge support spacer is comprised of two separated metal plates which separate the springs from the propellant and prevent the spring from embedding into the propellant. The current charge support spacer provides direct venting to an annulus between the inside of the motor case, outside the propellant grain and running back to the nozzle. The current spacer is made of sheet steel which permits radiative heating of the motor case, provides minimal contact area, and no ablative cooling.

Composite propellants have also been developed for use in rocket motors to improve performance and safety characteristics. Unfortunately with composite propellants, the heating of the rocket motor casing in the region of the charge support spacer charred and bulged the motor casing unacceptably. The present invention provides a solution to all of the problems described above.

SUMMARY OF THE INVENTION

The present invention comprises a direct replacement for the charge support spacer currently used in rocket motors as discussed above. The present invention comprises a vented spacer that cools combustion gases through contact, ablation, and expansion prior to equalizing pressure by transferring these gases from the inside of the propellant grain to the outside of the grain. The vented spacer also blocks the transfer of heat from the inside of the propellant to the rocket motor case by radiation. The gases are cooled to the point that they present no hazard to the rocket motor casing or the outer diameter of the propellant grain. The vented spacer accomplishes these tasks in the same amount of area as the charge support spacer.

Accordingly, it is the object of this invention to provide a device which cools combustion gases in a rocket motor and blocks radiation to prevent damage to the outside of the propellant grain or the motor case.

It is a further object of this invention to provide a device to equalize pressure between the inside and outside of propellant grain in a rocket motor while still providing the required support to the propellant grain.

This invention accomplishes these objectives and other needs related to improvement of venting combustion gases in a rocket motor.

BRIEF DESCRIPTION OF THE DRAWINGS

The accompanying drawings, which are incorporated in and constitute a part of the specification, illustrate embodiments of the invention, and, together with the description, serve to explain the principles of the invention.

FIG. 3A top view of another embodiment of the present invention.

DESCRIPTION OF THE PREFERRED EMBODIMENT

The invention, as embodied herein, comprises a vented spacer for equalizing pressure from combustion gases between the inside and the outside of the propellant grain in a rocket motor. The vented spacer comprises a generally circular ring comprising ablative material placed adjacent to the propellant grain. Formed within the ring is a plurality of angled flow paths. These flow paths provide a pathway for the combustion gases sufficient to equalize the pressure from the combustion gases between the inside and the outside of the propellant grain. The combustion gases are cooled through contact with, ablation of, and expansion through the angled flow paths in the spacer. Heat transfer is also reduced by blockage of infrared radiation between the inside and outside of the spacer.

Figure 1:
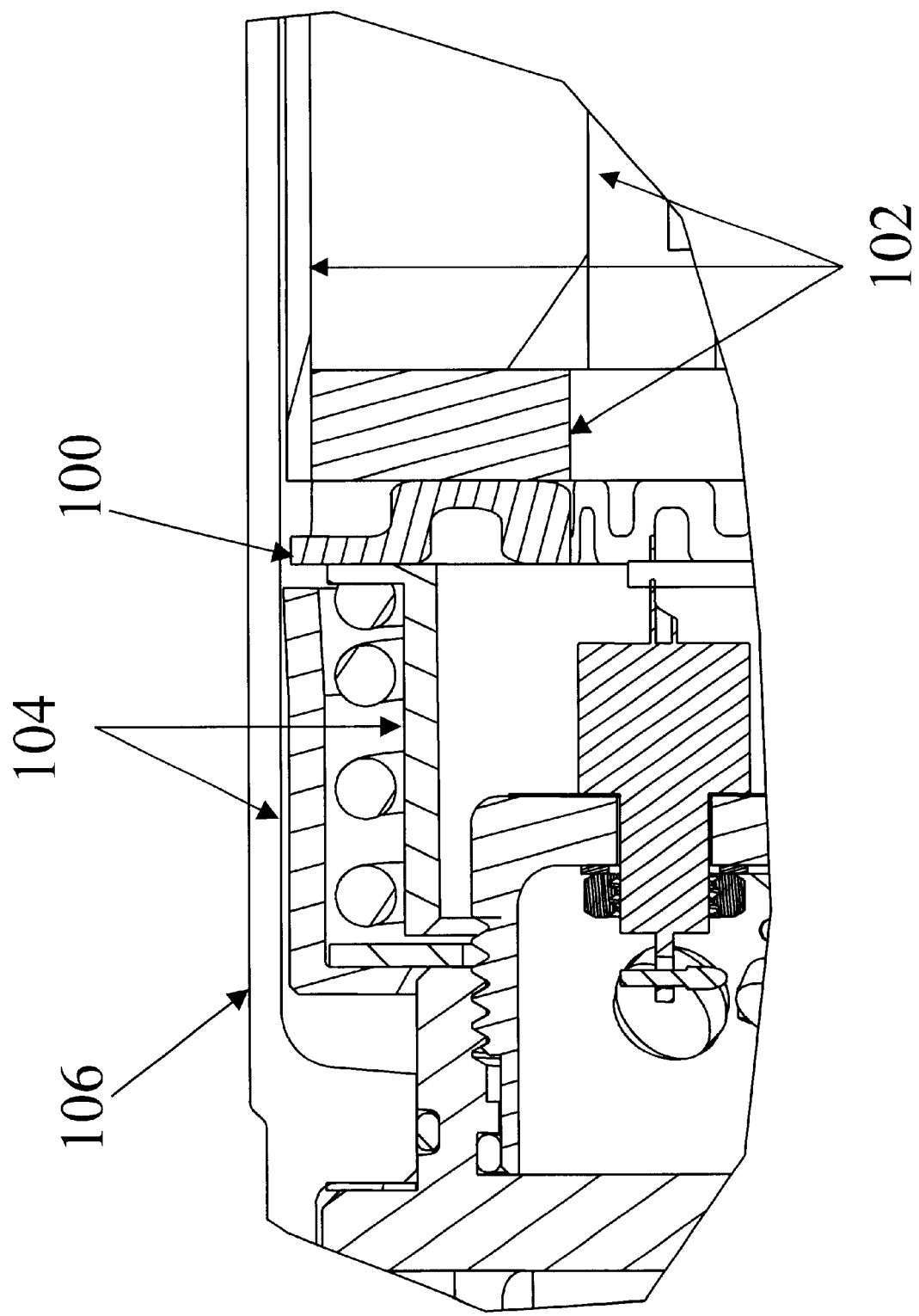
FIG. 1 is a cross-sectional view of a rocket motor showing the placement of the present invention.

Referring to FIG. 1, the vented spacer 100 is placed in contact and between the propellant grain 102 and springs 104 which are designed to hold the propellant grain 102 within the rocket motor casing 106. The combustion gases from the inside of the propellant grain 102 are forced to travel through the vented spacer 100 before contacting the outside of the propellant grain 102 and the rocket motor casing 106. By cooling the combustion gases and blocking infrared radiation as mentioned above, the vented spacer 100 equalizes the pressure from the combustion gases between the inside and the outside of the propellant grain 102 to prevent heating failure of the rocket motor casing 106 and undesired lighting of the outside of the propellant grain 102.

Figure 2B:
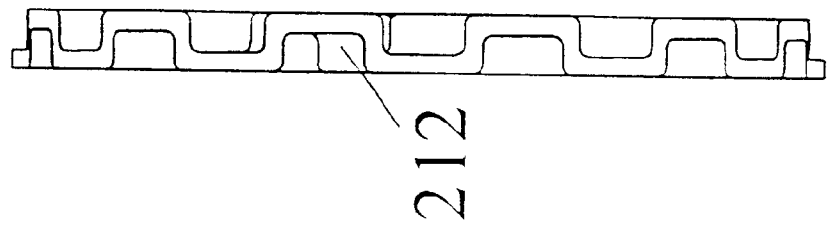
FIG. 2B is a side view of the embodiment of the invention shown in FIG. 1A.
Figure 2A:
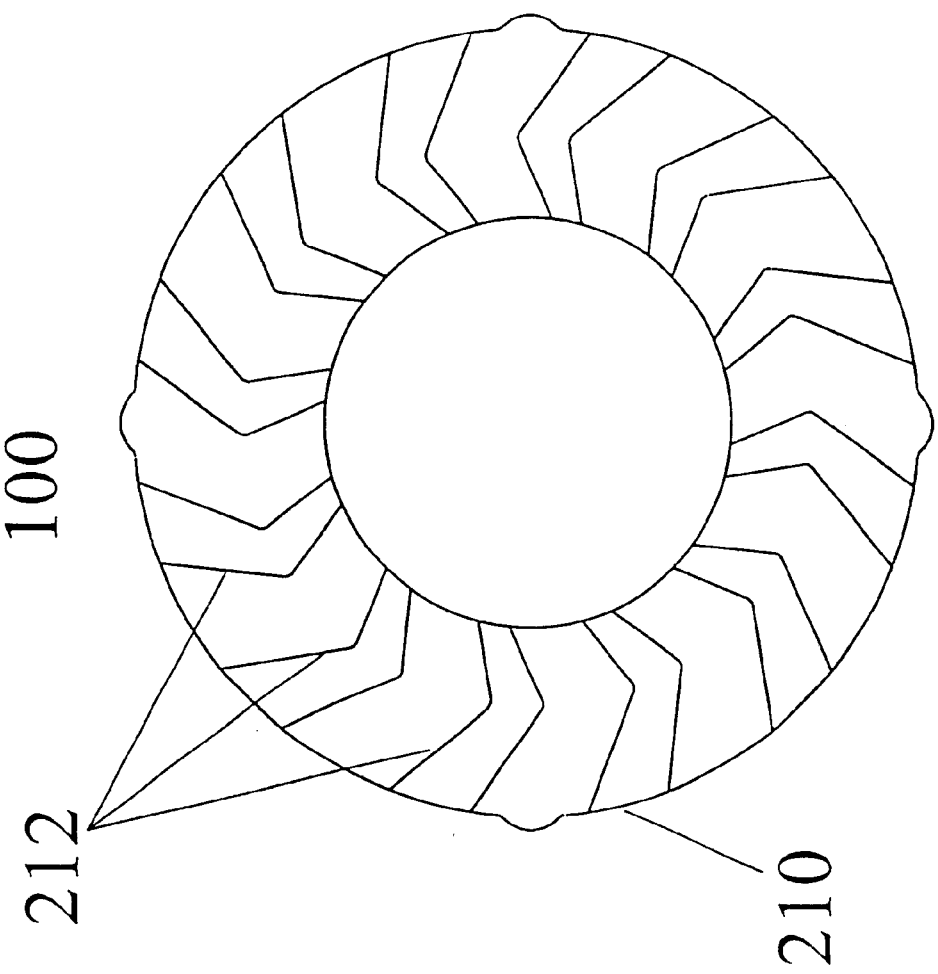
FIG. 2A is a top view of an embodiment of the present invention.

Referring to FIGS. 2A and 2B, the vented spacer 100 comprises a generally circular ring 210 made of an ablative material. One preferred material is nylon with glass fibers to provide structural integrity. A more preferred material comprises nylon 6/6 with 30% glass fibers. A plurality of angled flow paths 212 are formed within the ring 210. As depicted in FIG. 2A, the flow paths 212 may be made by forming ribs or walls on the top surface of the ring 210 and the flow paths are created when the vented spacer 100 is placed in contact with a solid substance. The relative number, length, and width of the flow paths 212 can be determined by one skilled in the art, depending upon the flow rates necessary to provide a pathway for the combustion gases sufficient to equalize the pressure between the inside and the outside of the propellant grain in a burning rocket motor. The present invention cuts off direct radiative transfer of heat from the combustion gases via radial paths by forcing the gases to change direction, thus blocking direct light passage. The flow paths 212 increase the contact area, increasing heat transfer from the gases to the vented spacer 100. The expansion of gases moving through the vented spacer 100 further lowers the gas temperature. This embodiment of the present invention may be readily fabricated by any number of conventional fabrication techniques including injection molding, compression molding, and draping and machining.

Figure 3B:
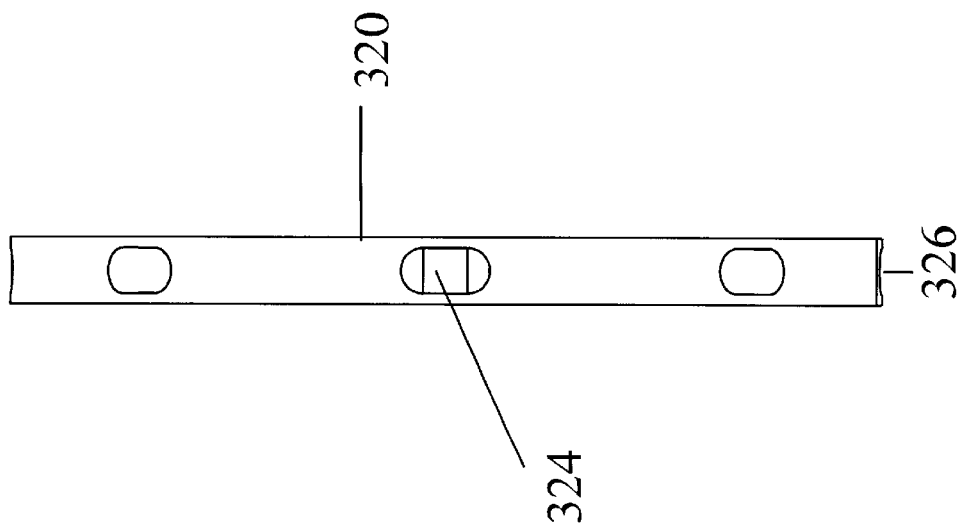
FIG. 3B is a side view of the embodiment of the invention shown in FIG. 3A.
Figure 3A:
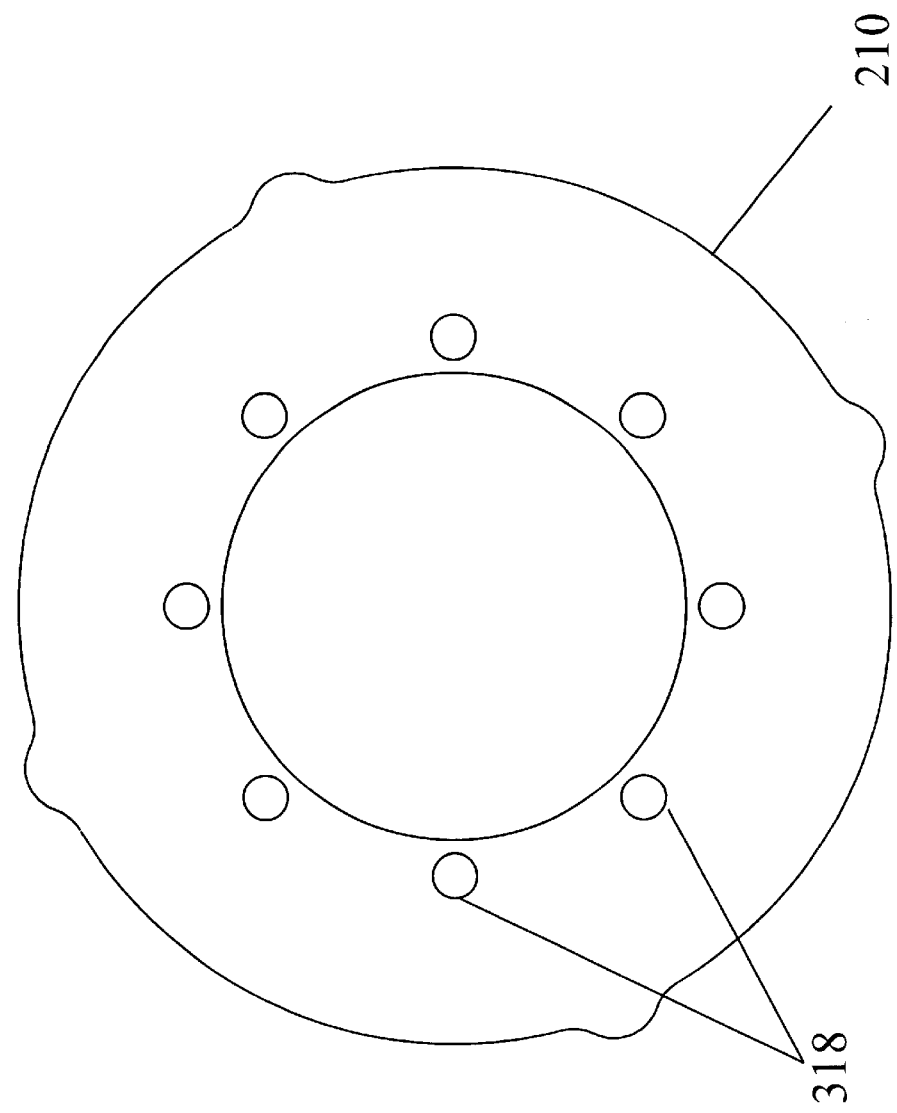

Several alternative embodiments of the present invention are possible. One such embodiment is set forth in FIG. 3A and 3B. This embodiment would be constructed of a similar ablative material. Referring to FIG. 3A, the generally circular ring 210 comprises a top of the ring 320 which would contact the propellant grain as in the previously described embodiment. In this embodiment, the flow paths are formed by drilling an entrance hole 318 in the top of the ring 320 adjacent to the inner surface 322 and an outer hole 324 on the outer surface 326 of the ring. The holes would meet at an angle creating an angled flow path for the combustion gases. This embodiment offers greater gas contact with the ablative material due to the greater angle, however, the flow area would be decreased and manufacture of this embodiment would be more expensive using current manufacturing techniques.

The present invention also includes a method of equalizing pressure from combustion gases between the inside and the outside of propellant grain of a rocket motor by providing a vented spacer 100, as set forth in FIG. 2A, and placing it adjacent to the propellant grain. The vented spacer 100 comprises a generally circular ring 210 comprising ablative material, and, a plurality of angled flow paths 212 formed on the ring wherein the flow paths provide a pathway for the combustion gases sufficient to equalize the pressure from the combustion gases between the inside and the outside of the propellant grain and the combustion gases are cooled through contact with and expansion through the angled flow paths 212.

What is described are specific examples of many possible variations on the same invention and are not intended in a limiting sense. The claimed invention can be practiced using other variations not specifically described above.

What is claimed is:

1. A vented spacer for equalizing pressure from combustion gases between an inside surface and an outside surface of a propellant grain in a rocket motor, comprising:

a generally circular ring comprising ablative material placed in contact with the propellant grain and at an end opposite to a nozzle of said motor; and, a plurality of angled flow paths formed on the ring wherein the flow paths provide a pathway for the combustion gases sufficient to equalize the pressure from the combustion gases between said inside surface and said outside surface of the propellant grain wherein the combustion gases are cooled through contact with and expansion through the angled flow paths.

2. The vented spacer of claim 1, wherein the ablative material comprises nylon reinforced with glass fibers.

3. The vented spacer of claim 2, wherein the ablative material comprises approximately 30% glass fibers.

4. The vented spacer of claim 3, wherein the ablative material comprises nylon 6/6.

5. The vented spacer of claim 1, further comprising:

a top of said ring facing said propellant grain;

an inner surface of said ring adjacent to said inside surface of said propellant grain;

an outer surface of said ring;

an entrance of the flow paths formed on the top of said ring proximate to said inner surface; and, an exit of the flow paths formed proximate to said outer surface.

6. A method of equalizing pressure from combustion gases between an inside surface and an outside surface of a propellant grain of a rocket motor, comprising the steps of:

providing a vented spacer placed adjacent to the propellant grain at an end opposite to a nozzle of said motor comprising a generally circular ring comprising ablative material, and, a plurality of angled flow paths formed within the ring wherein the flow paths provide a pathway for the combustion gases sufficient to equalize the pressure from the combustion gases between said inside surface and said outside surface of said propellant grain wherein the combustion gases are cooled through contact with and expansion through the angled flow paths.

* * * * *